Sept. 14, 1948.  L. CIESLAK  2,449,278
CONVEYER

Filed Sept. 27, 1946  3 Sheets-Sheet 1

INVENTOR.
LEO CIESLAK
BY
ATTORNEY

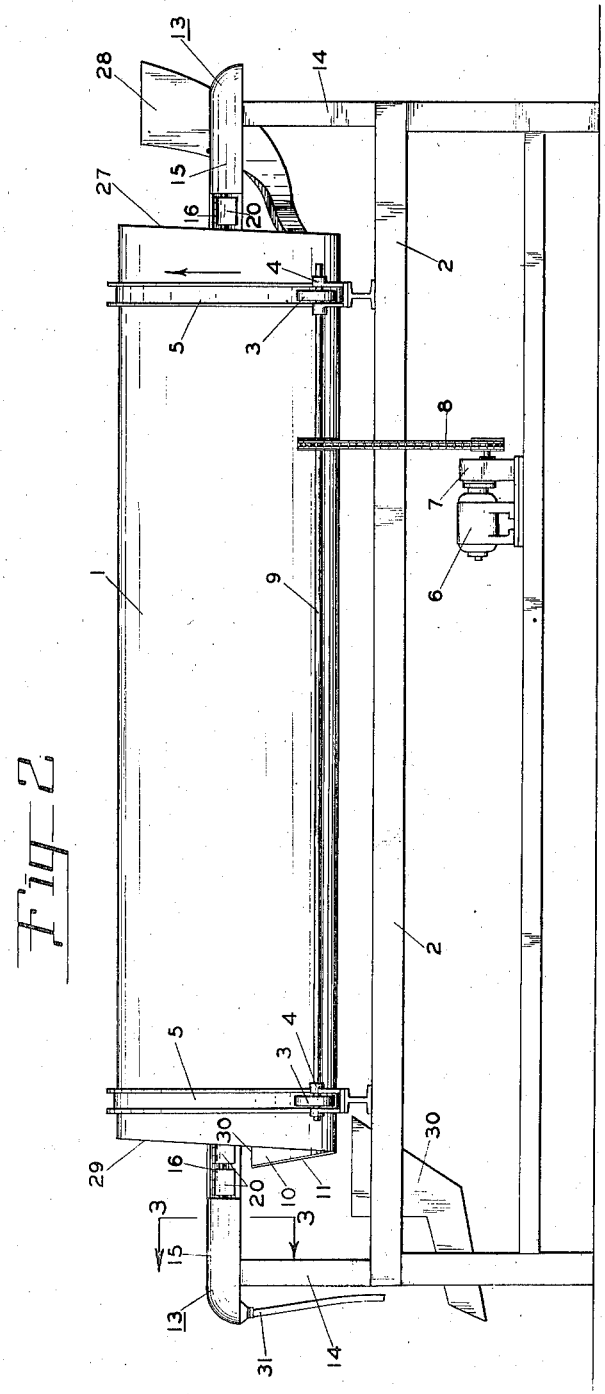
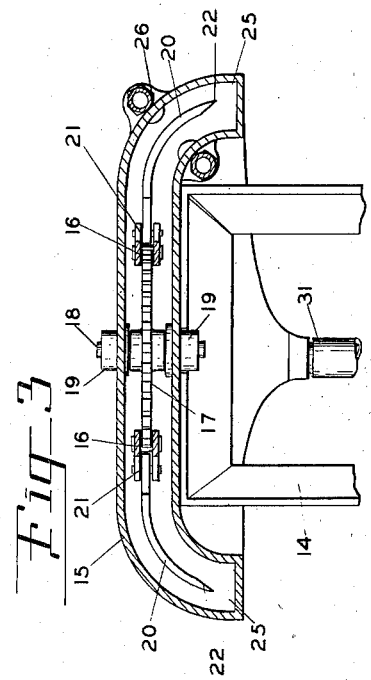
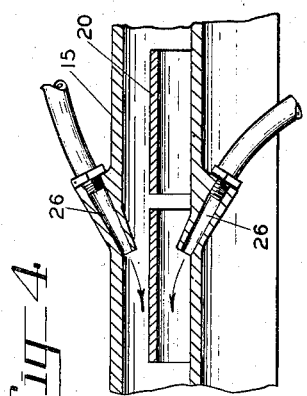

Sept. 14, 1948.    L. CIESLAK    2,449,278
CONVEYER

Filed Sept. 27, 1946    3 Sheets-Sheet 3

INVENTOR.
LEO CIESLAK
BY
ATTORNEY

Patented Sept. 14, 1948

2,449,278

UNITED STATES PATENT OFFICE 2,449,278

CONVEYER

Leo Cieslak, Salem, Oreg.

Application September 27, 1946, Serial No. 699,849

4 Claims. (Cl. 198—215)

This invention relates to conveyors and is particularly adapted for conveyors employed in moving fruits, vegetables and the like through dehydrators and quick freezers.

The primary object of the invention is to provide a conveyor that will move fruits and vegetables through dehydrators or quick freezers wherein the materials are continuously turned over while being conveyed through the conveyor permitting the air to flow in and around and between the materials.

It has been found that by revolving the materials as they are conveyed through a cylinder they will be maintained in their original shape and form and this is accomplished by the use of my new and improved conveyor.

A further object of the invention is to provide a means of cleansing the conveyor as the same is conveying the materials being either dehydrated or frozen.

These and other incidental objects will be apparent in the drawings, specification and claims.

Referring to the drawings:

Figure 2 is a side view of Figure 1.

Figure 3 is an enlarged fragmentary sectional view taken on line 3—3 of Figure 2.

Figure 4 is an enlarged fragmentary view taken on line 4—4 of Figure 1.

In the drawings:

Figure 1:
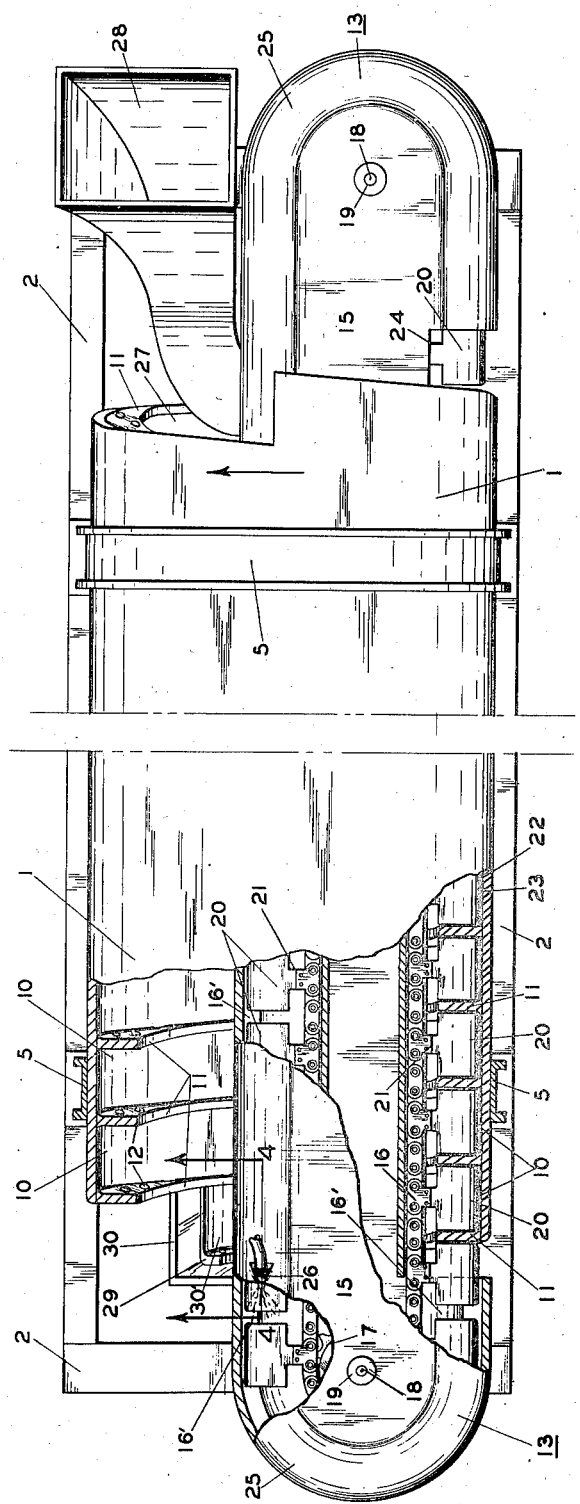
Figure 1 is a plan view of my new and improved conveyor, parts broken away for convenience of illustration.

My new and improved conveyor consists of a drum 1 mounted upon a suitable frame 2 by the use of trunnion wheels 3. The trunnion wheels are mounted upon the frame 2 by any suitable fastening means, as bearing brackets 4. These wheels operate in annular tracks 5, which are secured to the outer periphery of the drum 1. I have illustrated a driving motor 6, speed reducer 7 and driving chain 8 for driving the shaft 9 to which is keyed the trunnion wheels 3. I do not wish to be limited to any particular way of rotating the drum 1 as any suitable means may be employed.

Figure 5:
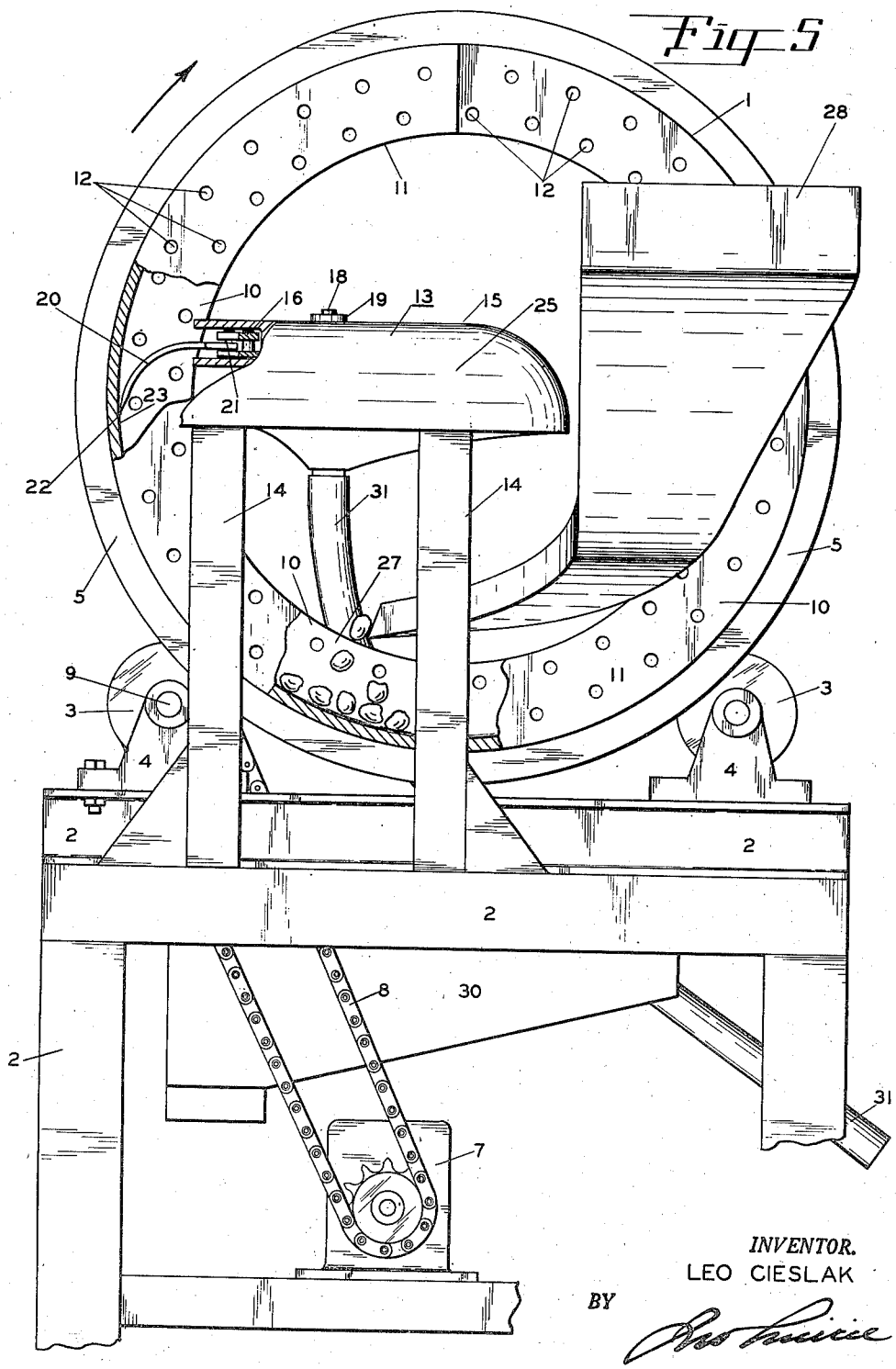
Figure 5 is an enlarged end view of the apparatus shown in Figure 2.

Running from one end to the other of the drum is a spiral trough 10. The trough 10 is formed by a continuous spiral member 11, which is secured to the inner periphery of the drum, best illustrated in Figures 1 and 5. This member may or may not be perforated as at 12, the perforations providing for the circulation of air within the trough 10.

A cleansing unit as indicated in general by numeral 13 is mounted longitudinally of the drum 1 on the brackets 14, which are mounted to the frame 2. This cleansing unit consists of a housing or tunnel 15 having a chain 16 trained about the sprockets 17, which are fixedly mounted to the stub shafts 18, journalled by suitable bearings 19 located on either end of the tunnel 15.

Scrapers 20 are fixedly secured at 21 to the chain 16 and are spaced apart at 16' so as to be positioned on opposite sides of the member 11 forming the trough 10. This is best illustrated in Figure 1. The ends 22 contact the bottoms 23 of the trough 10 and maintain it in a cleansed condition as the same is conveying the materials therethrough. Also the spiral member 11 moves the scraper along therewith causing the movement of the scrapers and the chain 16 around the sprockets 17.

The drum or housing 15 is cut away as at 24 along the inner side of the cylinder adjacent to where the scrapers contact the same permitting these scrapers to operate, but the tunnel or housing is generally closed as indicated at 25, which includes one side and both ends.

Located adjacent the discharge end of the cylinder are suitable spray nozzles 26 which are supplied with a flushing liquid, as for instance hot steam or water, these nozzles cleanse the scrapers as they pass between them.

In the operation of my new and improved conveyor the materials are fed into the end 27 of the cylinder 1 by way of a chute or spout 28 into the trough 10, and as the cylinder is revolved in the direction of the arrows these materials, as for instance berries being brought to a frozen state, are fed to the discharge end 29 of the cylinder and discharged into a delivery chute 30 from the end 30' of the spiral. As these materials are fed along through the trough 10 they keep continuously rolling over which causes them to maintain their original shape so that when they are completely frozen they will be of uniform structure.

There will be a certain amount of materials cling to the troughs 10 and herein is the object of the scrapers 20 working within the troughs. A suitable drainage spout is provided at 31 for draining the cleansing fluid from the housing or tunnel 15. I have not attempted to show a dehydrating or freezing unit connected to the cylinder 1, but it would be directed into one of the ends of the cylinder preferably the feed end, any suitable known method or medium either in the form of hot or cold air depending upon the process involved.

I do not wish to be limited to the exact mechanical structure as illustrated and described as other mechanical equivalents may be substituted still coming within the scope of my claims.

I claim:

1. A conveyor comprising a rotatable cylinder, a spiral material receiving trough formed within and extending throughout the length of the cylinder, an endless trough cleaning device including scrapers fitting within the spiral trough, and means for feeding the material into the conveyor at one end of the trough.

2. A construction as defined in claim 1, wherein the trough cleaning device includes an endless chain, scraper elements carried thereby and substantially of the same depth and width as the similar dimensions of the trough.

3. A construction as defined in claim 1, wherein the cleaning device includes a housing fixed against movement and mounted within and extending beyond both ends of the cylinder, an endless chain mounted for movement in the housing, and scraper members fitting within the trough and formed in sections carried by the chain, the movement of the cylinder tending to feed the scraper members throughout the trough and to feed such scraper members longitudinally of the cylinder.

4. A conveyor comprising a cylinder, means for revolving the cylinder, a trough for the material extending spirally within the cylinder, a scraper assembly mounted within the cylinder and fixed against revolution with the cylinder, said scraper assembly including a housing, an endless chain movable in the housing, scraper members fixed in spaced relation on the chain, said scraper members fitting within the trough during the operation of the cylinder to serve as material cleansing units for the sides of the trough, and means including nozzles carried by the housing for admitting a flushing liquid to cleanse the scrapers during their operative movement.

LEO CIESLAK.